United States Patent

Tessier

(10) Patent No.: US 8,120,528 B2
(45) Date of Patent: Feb. 21, 2012

(54) APPARATUS FOR SATELLITE TELECOMMUNICATIONS

(76) Inventor: Thomas Ronald Tessier, Winnipeg (CA)

(*) Notice: Subject to any disclaimer, the term of this patent is extended or adjusted under 35 U.S.C. 154(b) by 274 days.

(21) Appl. No.: 12/120,287

(22) Filed: May 14, 2008

(65) Prior Publication Data

US 2009/0284411 A1     Nov. 19, 2009

(51) Int. Cl.
    *G01S 19/11*     (2010.01)
(52) U.S. Cl. .................................................. 342/357.48
(58) Field of Classification Search . 342/357.01–357.78
See application file for complete search history.

(56) References Cited

U.S. PATENT DOCUMENTS

| | | | | |
|---|---|---|---|---|
| 5,812,932 A | * | 9/1998 | Wiedeman et al. | 455/13.1 |
| 2009/0182502 A1 | * | 7/2009 | Riter et al. | 701/214 |

* cited by examiner

*Primary Examiner* — Thomas Tarcza
*Assistant Examiner* — Nga X Nguyen
(74) *Attorney, Agent, or Firm* — Adrian D. Battison; Ade & Company Inc.

(57) ABSTRACT

A portable communication device has a first system for receiving signals from GPS satellites and a second system for communication with multiple satellites of a low orbit communications system. The device is arranged, at a time of required transmission, to monitor the elevation and azimuth of the GPS satellites in view so as to generate an elevation mask of where the sky is open at the time and to commence a required transmission only if the calculation prediction indicates that at least one of the satellites of the low earth orbit communication satellite system is in view.

4 Claims, 2 Drawing Sheets

APPARATUS FOR SATELLITE TELECOMMUNICATIONS

This invention relates to an apparatus for satellite telecommunications and particularly to an apparatus which is arranged to reduce the ratio of unsuccessful transmissions as compared to the total number of transmission attempts primarily for purposes of power saving.

BACKGROUND OF THE INVENTION

It is known that problems are encountered in using satellite communication devices in mountainous areas where a view of the sky can be blocked to where the satellites are located as they move across the sky.

This is particularly applicable to low-earth orbit satellite communication systems, including Orbcomm, Iridium and Globalstar, where the satellites change position relative to observers on the ground. Thus, even though a satellite is expected to be in view above the horizon, it is in fact blocked due to the presence of a mountain in the direction concerned.

This can lead to many failed communication attempts which are inconvenient and more importantly use significant power leading to drain on portable equipment where the power supply is a significant part of the weight and volume of the equipment.

SUMMARY OF THE INVENTION

It is one object of the invention to provide an apparatus for satellite telecommunications which is arranged to reduce the ratio of unsuccessful transmissions as compared to the total number of transmission attempts.

According to one aspect of the invention there is provided an apparatus for satellite telecommunications comprising:

a mobile communication device for movement over the Earth to different locations;

the mobile communication device having a first system for receiving signals from the Global Positioning System (GPS) satellites;

the mobile communication device having a second system for communication with a low-earth orbit communication satellite system that contains multiple satellites that each pass overhead, in and out of view to the communication device;

the first and second systems being arranged such that, at a time of required transmission on the second system, the first system operates to monitor the elevation and azimuth of at least some of those GPS satellites in view so as to generate an elevation mask of where the sky is open at the time;

the first and second systems being arranged such that, using the elevation mask of where the sky is open at the time, the second system operates to calculate from data available for the low-earth orbit communication satellite system and the elevation mask a prediction of whether at least one of the satellites of the low earth orbit communication satellite system is in view;

and the first and second systems being arranged such that the required transmission is commenced only if the calculation prediction indicates that at least one of the satellites of the low earth orbit communication satellite system is in view.

Although the above refers to two systems, the apparatus may comprise a single processor programmed with both systems as two separate protocols operated by the same processor.

If the remote unit processor was too slow or otherwise not capable of doing the communication system ephemeris calculation, a small file with prediction times and positions can be communicated to the devices in the field from time to time. This table could be compared to the visibility mask generated from the GPS when it is time to transmit. There are ways to encode the table data that are extremely efficient and would take very little air time.

However, preferably the device includes a memory arranged such that each low-earth orbit satellite in the low-earth orbit communication satellite system has an ephemeris stored in the memory wherein the ephemeris of each satellite is used by a satellite visibility prediction subroutine to determine when the next visible pass of each satellite will be, and what the azimuth and elevation of each pass will be.

This concept is thus based on problems encountered in using satellite communication device in mountainous areas but can also be applied to situations where a view of the sky where satellites are located is blocked for example by buildings, equipment or even the body of the user.

Thus, for any equipment portable or fixed, it will increase the ratio of successful transmissions as compared to the total number of transmission attempts. In addition, this increases system efficiency by reducing the number of partial transmissions and lost acknowledgement transmissions.

The system uses two separate satellite systems. The mobile communicator on the ground can receive signals from (1) the Global Positioning System (GPS) satellites, and can communicate with (2) a low-earth orbit communication satellite system that contains multiple satellites that each pass overhead, in and out of view to the user on the ground with the communication device.

Although it is possible to predict, using conventional systems, when communication satellites are above the horizon and thus available for communications, conventional systems cannot predict how much of the sky is obscured by obstacles such as mountains, buildings, or even a user's body.

Therefore, in situations where the view of the sky is blocked, many satellite communication attempts fail. With battery powered equipment, this is a particularly important problem, as a significant portion of battery capacity is wasted with transmission retries. This eliminates this wasted power by ensuring there is a view of the sky in the direction of the communication satellite before transmission attempts are made.

Secondly, in any type of system, be they battery powered or hard-wired to vehicle electrical systems and thus have "unlimited" power, transmitting when there is a clear view of the communications satellite improves satellite and overall system use efficiency. This increase in efficiency is due to a lower number of partial transmissions, fewer lost transmission acknowledgements and reduced transmission retries.

GPS satellite receivers and receiver chipsets are much more power efficient than they used to be. Using a GPS receiver as a "sounding" system that provides the satellite communicator with a way to know where the sky is visible is much more power efficient than turning on a satellite communication receiver subsystem and listening for satellites, or making satellite communication transmissions "blind" in the hope they get through.

Since the GPS system has many satellites that are continuously in view at any location, the satellite communicator can monitor the elevation and azimuth of each GPS satellite in view. This shows the communicator where the sky is visible at that particular instant. Elevation and azimuth data is available from the GPS receiver on board the satellite communicator device.

The satellite communicator will also have the ephemeris of each low-earth orbit satellite in the low-earth orbit communication satellite system in memory. The ephemeris of each satellite is used by a satellite visibility prediction subroutine in the satellite communicator to determine when the next visible pass of each satellite will be, and what the azimuth and elevation of each pass will be.

Since the satellite communicator has an "elevation mask" of where the sky is open at the present time due to the constant monitoring of GPS satellites, the satellite communicator can now begin communication transmissions to the low-earth orbit communication satellite when it is predicted to be within the "mask" previously calculated. This will result in a very high probability of the transmission being successful on the first try. This results in reduction in power use and increased efficiency of satellite resources.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
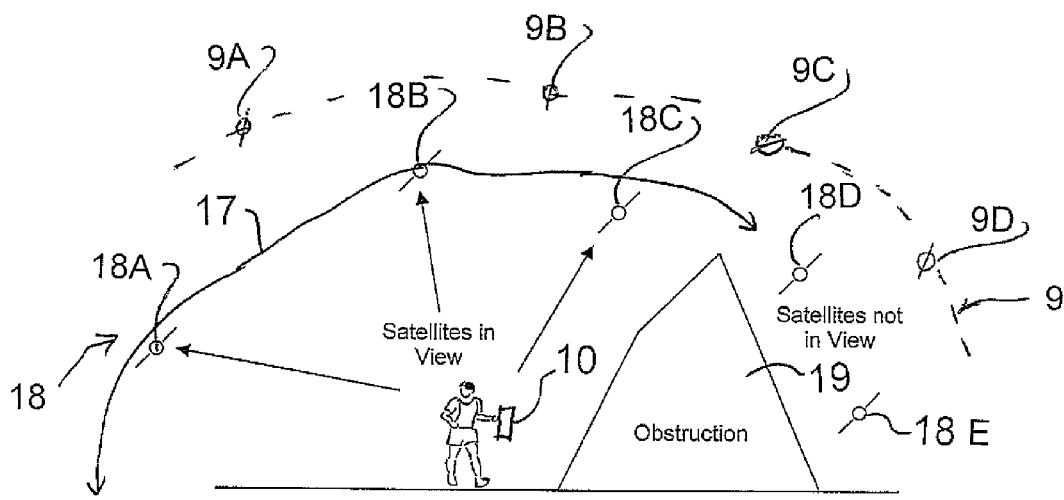
FIG. 1 is a schematic illustration of a person carrying an apparatus for satellite telecommunications according to the present invention.
Figure 2:
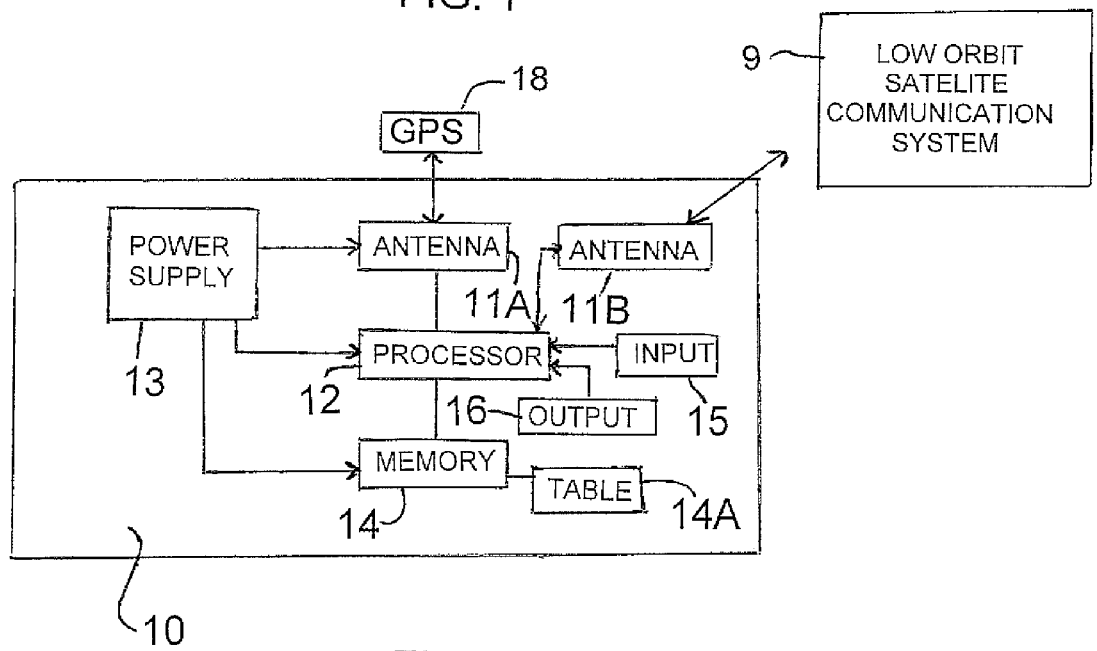
FIG. 2 is a schematic illustration the apparatus of FIG. 1 for satellite telecommunications according to the present invention.

The apparatus as shown in FIGS. 1 and 2 includes a portable device 10 which includes an antenna or antennas 11A and 11B for communications with the GPS system 18 and telecommunications system 9. The low orbit satellite communication system includes satellites 9A to 9D. The GPS system includes satellites 18A to 18D. As is well known, the satellites of both systems are moving relative to the earth surface so that at any specific time different ones are visible by the antennas 11A and 11B of the portable device 10 and they are at different locations relative to the portable device 10. The portable device 10 further includes, a processor 12 for carrying out the communications protocols described hereinafter, a power supply 13 which is generally a battery, a memory 14 of the processor containing a table 14A, an input 15 for the user to enter or enable communications to be transmitted and an output 16 for communicating the received communications to the user. Communications may be initiated on user command or may be initiated by an automatic system using a trigger condition such as a timer. In such case, there may be no user interface at all, other than a power switch.

The apparatus uses the protocols described above together with the well known protocols necessary for GPS location detection and for two way telecommunication with a low earth orbit communication satellite system. These protocols are not described herein as they are well known to persons skilled in this art.

Figure 3:
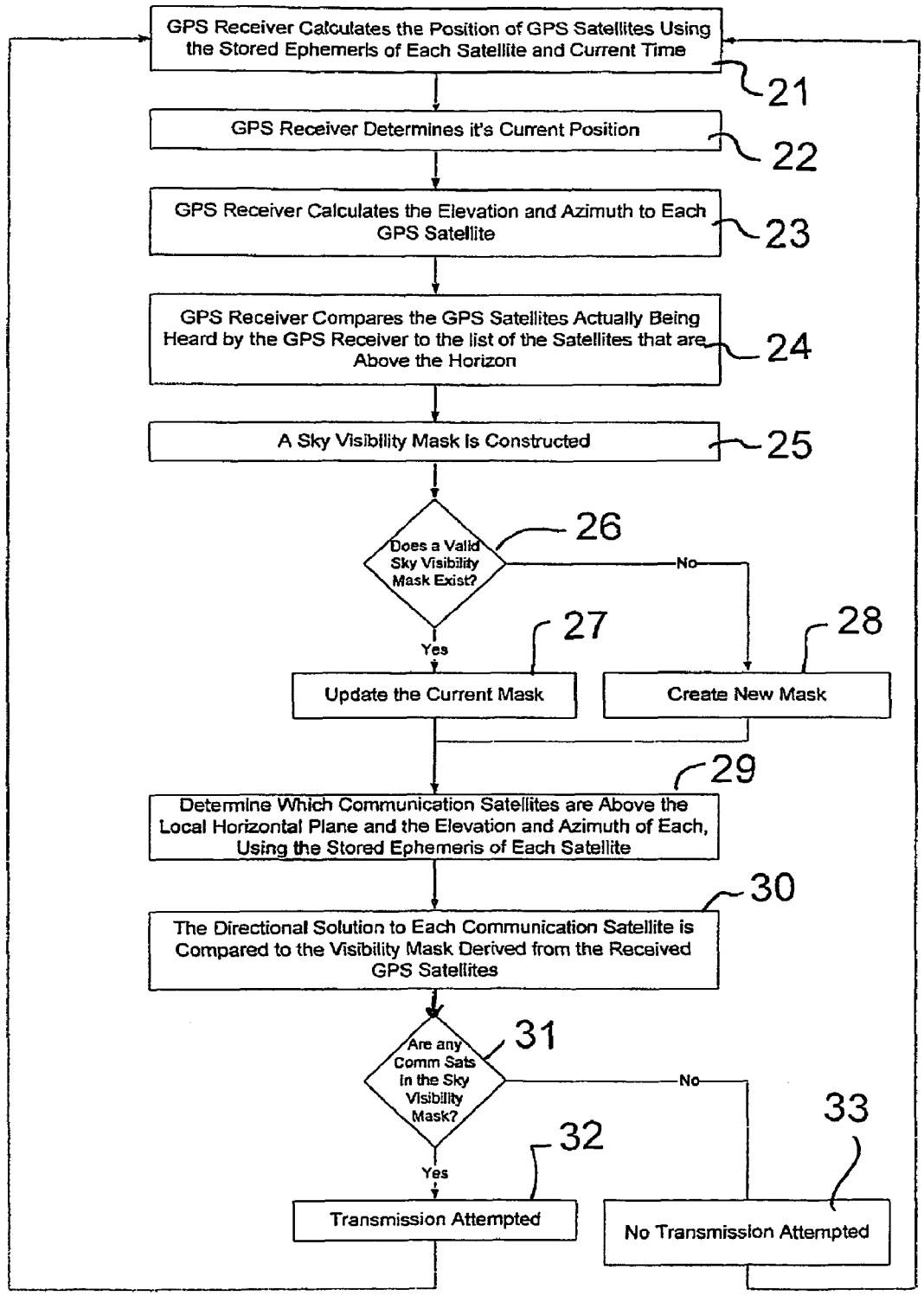
FIG. 3 is a flow chart for the calculations for the apparatus for satellite telecommunications of FIGS. 1 and 2.

The method of the present invention by which transmissions to the low-earth orbit satellite communication systems is commenced only if the above calculation prediction indicates that at least one of the satellites of the low earth orbit communication satellite system is in view is shown in more detail in the flow chart of FIG. 3 and described as follows:.

At step 21 the GPS receiver calculates the position of GPS satellites around the earth using the stored ephemeris of each satellite and current time, and GPS receiver receiving GPS satellite signals determines the current position of the GPS receiver based on the GPS satellite signals received.

At step 22 and 23 the GPS receiver calculates the 2 dimensional direction solution to each GPS satellite relative to the GPS receiver position in terms such as elevation degrees above the horizon and azimuth degrees from a reference point such as true north for each GPS satellite determined to be above local horizontal plane of the earth or a specified offset from the local horizontal plane of the earth.

At step 24 the GPS receiver determines which of the satellites 18A to 18E that are above the specified local horizontal plane of the earth or the specified offset from the local horizontal plane of the earth are actually being heard by the GPS receiver.

At step 25 the processor uses the directional data for each satellite 18A, 18B, 18C and 18D that is visible, and possibly in addition to directional data for each satellite 18E that is not visible as obstructed by a an obstruction 19, to construct a sky visibility mask or elevation mask 17.

As shown at steps 26, 27 and 28, if a sky visibility mask has been previously calculated within a reasonable window of time, this previously calculated sky mask is updated with the new solutions, while the oldest solutions may be dropped from the sky mask solution and a new mask created at step 28.

At step 29, using current time, the positions of communication satellites around the earth are determined using the stored ephemeris of each satellite. This information is periodically downloaded into the table 14A of the memory 14.

At step 30, using current position and current time, the direction solution to each communications satellite relative to the GPS receiver position is determined and the directional solution to each communication satellite is compared to the visibility mask derived from the received GPS satellites.

As shown at steps 31, 32 and 33, if all communication satellites are outside the area of visibility of the visibility mask a transmission will not be attempted and thus a transmission is commenced only if the calculation prediction indicates that at least one of the satellites of the low earth orbit communication satellite system is in view.

If all communication satellites are outside the area of visibility of the visibility mask a transmission will not be attempted and the estimated time to next visibility may be calculated. As satellites are passing regularly, the time to the next available transmission is generally short so that there is little or no interference with the communications verbal or data from the user to the low-earth orbit satellite communication system.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for satellite telecommunications comprising:
   a portable mobile communication device;
   the mobile communication device having a first system for receiving signals from the Global Positioning System (GPS) satellites;
   the mobile communication device having a second system for communication with a low-earth orbit communication satellite system that contains multiple satellites that each pass overhead, in and out of view to the communication device;
   the first and second systems being arranged such that, at a time of required transmission on the second system, the first system operates to monitor the elevation and azimuth of at least some of those GPS satellites in view so as to generate an elevation mask of where the sky is open at the time;

the first and second systems being arranged such that, using the elevation mask of where the sky is open at the time, the second system operates to calculate from data available for the low-earth orbit communication satellite system and the elevation mask a prediction of whether at least one of the satellites of the low earth orbit communication satellite system is in view;

and the first and second systems being arranged such that the required transmission is commenced only if the calculation prediction indicates that at least one of the satellites of the low earth orbit communication satellite system is in view.

2. The apparatus according to claim 1 wherein a table containing prediction times and positions of the low-earth orbit satellites in the low-earth orbit communication satellite system is communicated to the device from time to time and is compared to the elevation mask generated from the GPS system.

3. The apparatus according to claim 1 including a memory and wherein the memory is arranged such that each low-earth orbit satellite in the low-earth orbit communication satellite system has an ephemeris stored in the memory wherein the ephemeris of each satellite is used by a satellite visibility prediction subroutine to determine when the next visible pass of each satellite will be, and what the azimuth and elevation of each pass will be.

4. The apparatus according to claim 1 wherein the first and second systems are arranged such that, when the apparatus is activated, the first system operates to constantly monitor the elevation and azimuth of at least some of those GPS satellites in view.

\* \* \* \* \*